(12) United States Patent
Karvonen et al.

(10) Patent No.: US 6,409,643 B2
(45) Date of Patent: *Jun. 25, 2002

(54) TAKE-OUT LEADING ROLL, SPREADER ROLL, OR EQUIVALENT FOR A WEB-LIKE MATERIAL

(75) Inventors: Lassi Karvonen, Jyskä; Pekka Koivukunnas, Järvenpää, both of (FI)

(73) Assignee: Valmet Corporation, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,491
(22) PCT Filed: Oct. 30, 1997
(86) PCT No.: PCT/FI97/00663
§ 371 (c)(1),
(2), (4) Date: Jul. 2, 1999
(87) PCT Pub. No.: WO98/19949
PCT Pub. Date: May 14, 1998

(30) Foreign Application Priority Data

Nov. 4, 1996 (FI) .............................................. 960546 U

(51) Int. Cl.[7] .............................................. B29C 43/46
(52) U.S. Cl. ............................................ 492/6; 492/20
(58) Field of Search ............................. 492/6, 20, 26; 162/272, 273

(56) References Cited

U.S. PATENT DOCUMENTS

| 3,672,018 A | | 6/1972 | Junk et al. |
|---|---|---|---|
| 3,745,625 A | * | 7/1973 | Jaegers et al. |
| 3,786,975 A | | 1/1974 | Heymanns |
| 4,043,622 A | * | 8/1977 | Hotchkiss et al. |
| 4,233,011 A | * | 11/1980 | Bolender et al. |
| 4,470,183 A | | 9/1984 | Kuosa |
| 4,692,971 A | | 9/1987 | Ginter |
| 4,856,159 A | * | 8/1989 | Skytta |

FOREIGN PATENT DOCUMENTS

| CA | 766843 | 9/1967 |
|---|---|---|
| EP | 0363887 | 4/1990 |
| GB | 2015695 | 9/1979 |
| GB | 1582396 | 1/1981 |

OTHER PUBLICATIONS

PCT International Search Report.

* cited by examiner

Primary Examiner—S. Thomas Hughes
Assistant Examiner—T. Nguyen
(74) Attorney, Agent, or Firm—Steinberg & Raskin, P.C.

(57) ABSTRACT

A take-out leading roll, spreader roll or equivalent for a web-like material including a non-revolving roll axle having end parts and a middle part situated between the end parts, and a continuous and tubular roll mantle revolvingly journalled by bearings on the roll axle and extending over the end parts and the middle part. The middle part is pivotally linked to the end parts to enable the roll to be bent to a desired arcuate shape. The roll mantle is preferably journalled on the roll axle only in the areas of the roll ends by bearings supported on the end parts of the roll axle. The material of the roll mantle is preferably a composite material.

20 Claims, 4 Drawing Sheets

TAKE-OUT LEADING ROLL, SPREADER ROLL, OR EQUIVALENT FOR A WEB-LIKE MATERIAL

FIELD OF THE INVENTION

The invention concerns a take-out leading roll, spreader roll, or equivalent for a web-like material, which roll comprises a non-revolving roll axle and a roll mantle journalled revolvingly by means of bearings on said roll axle, and which roll can be bent to the shape of the desired arc.

BACKGROUND OF THE INVENTION

Take-out leading rolls and spreader rolls have been formed most commonly so that they have a continuous axle and a roll mantle fitted on the axle, which roll mantle is again composed of a number of parts. The take-out leading roll can be made to be curved to the desired shape by shifting the outer journalling points of the roll mantle in the radial direction, in which connection the mantle forms an arc or a broken line. As a rule, each of the mantle parts is journalled separately on the axle, in which case the arrangement comprises a number of bearings. The conventional solutions involve a number of problems and drawbacks, which are, among other things, problems of journalling of the roll and peaks of heat produced by the journalling in the paper web. The making of the mantle of a number of parts may also constitute a considerable problem, because the gaps between the parts may mark the paper web and because the arc form of the roll is not optimal, but the line of shape of the roll is shaped as a broken line. Further, owing to the metallic roll mantle, problems of corrosion may arise. One such prior-art spreader roll is described, for example, in the U.S. Pat. No. 4,692,971. Attempts have been made to provide an improvement over such a prior-art spreader roll, for example, so that a coating layer of a resilient material has been fitted onto the metal mantle consisting of a number of parts, the objective of this arrangement being in particular to provide an improvement concerning the problem of marking of the paper web and concerning optimization of the arc form of the roll. However, the journalling system of the roll is similar to that described above, and, thus, also the problems related to the journalling are unchanged. Such a spreader roll is described, for example, in the Canadian Patent No. 766,843.

Earlier, attempts have been made to find a solution for the problem arising from a roll mantle consisting of a number of parts also so that, as the roll mantle, a continuous metal tube mantle has been used which has been provided with "cuts", i.e. into which slots have been formed in order to facilitate the bending of the roll mantle. This construction, however, causes its own problems, one remarkable one of said problems being the fact that, owing to its construction, the roll mantle becomes quite slack, i.e. excessively readily bending. In such a case, the roll mantle concerned must be supported on the roll axle by means of bearings at a number of points, for which reason the problems described above and arising from the journalling remain unchanged. Also, the cost of manufacture of the roll mantle is relatively high because of the mode of manufacture.

OBJECTS AND SUMMARY OF THE INVENTION

The object of the present invention is to provide a novel construction of a take-out leading roll, spreader roll or equivalent, by whose means the problems related to the prior art described above are avoided. In view of achieving the objectives of the invention, the invention is mainly characterized in that the roll mantle is a continuous, tubular mantle, and that the roll axle consists of three parts linked with one another, i.e. of two end parts and of a middle part, which are pivotal in relation to one another for the purpose of bending the roll mantle.

By means of the invention, quite a considerable advantage is achieved over the prior art, and of the advantages obtainable by means of the invention, for example, the following should be stated. Owing to the construction in accordance with the invention, in the roll it is possible to use a mantle consisting of one part. As the material of the mantle, it is favourably possible to use a composite material, in which case the lowest natural frequencies of the roll can be raised to such a high level that a roll mantle supported exclusively at the ends can be used as the construction. In such a case the problems of heat arising from journalling, related to the prior art, can be avoided. When a fully continuous roll mantle with no gaps is used, all problems of marking of the paper web can also be avoided. When a composite material is used as the material of the roll mantle, all problems of corrosion can also be avoided. The further advantages and characteristic features of the invention come out from the following detailed description of the invention.

BRIEF DESCRIPTION OF THE DRAWINGS

In the following, the invention will be described by way of example with reference to the figures in the accompanying drawing.

DETAILED DESCRIPTION OF THE PREFERRED EMBODIMENTS

Figure 1:
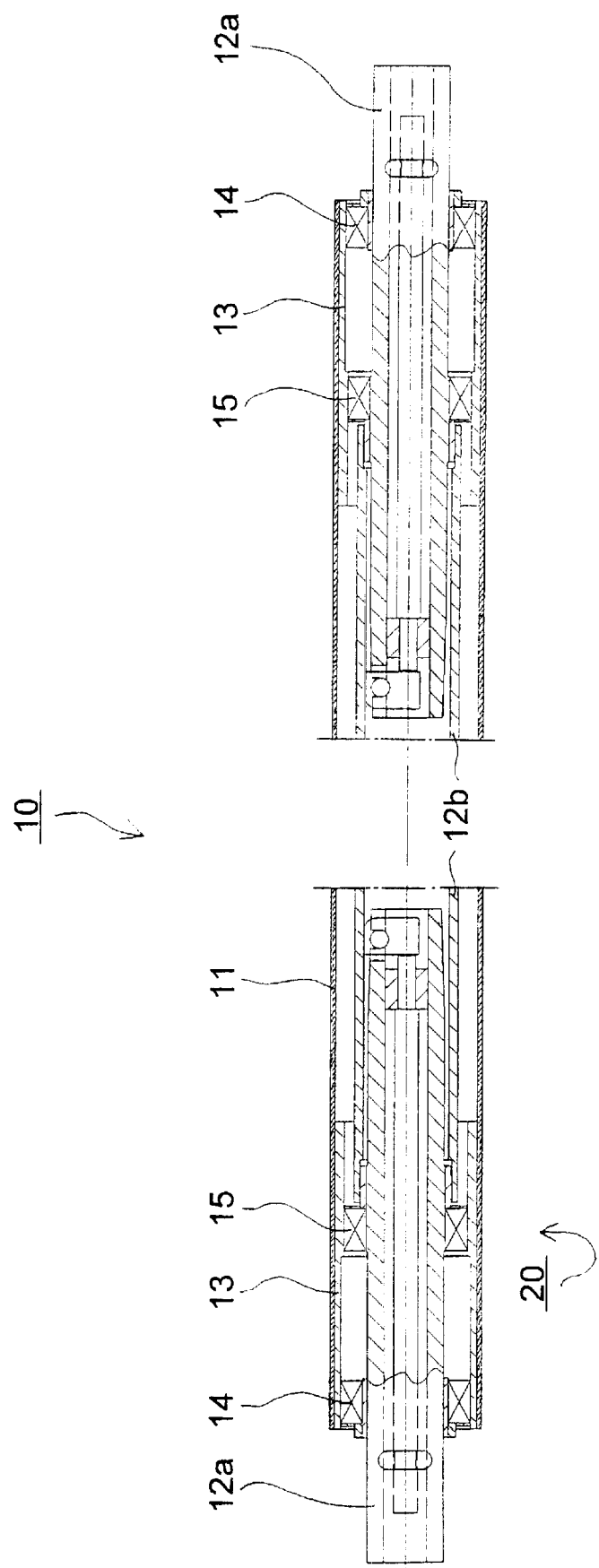
FIG. 1 is a fully schematic sectional view of a roll in accordance with the invention, in particular illustrating the mechanism of bending of the roll.

In FIG. 1 the roll is denoted generally with the reference numeral 10. The roll 10 comprises a roll mantle 11, which is fitted to revolve on a non-revolving axle 12a, 12b. The roll axle consists of three parts, i.e. the end parts 12a and the middle part 12b. In the end areas of the roll 10, support sleeves 13 have been fitted, on which the roll mantle 11 itself is again mounted. Thus, the roll mantle 11 is journalled on the axle 12a, 12b through said support sleeves 13 by means of bearings 14,15, which form a pair of bearings and which have been mounted, in the way illustrated in FIG. 1, at an axial distance from one another. The roll mantle 11 is continuous and extends from end to end in the roll. In FIG. 1, the mechanism of bending of the roll is denoted generally with the reference numeral 20, and different alternative embodiments of said mechanism of bending are described in more detail in relation to FIGS. 2 to 4.

Figure 2:
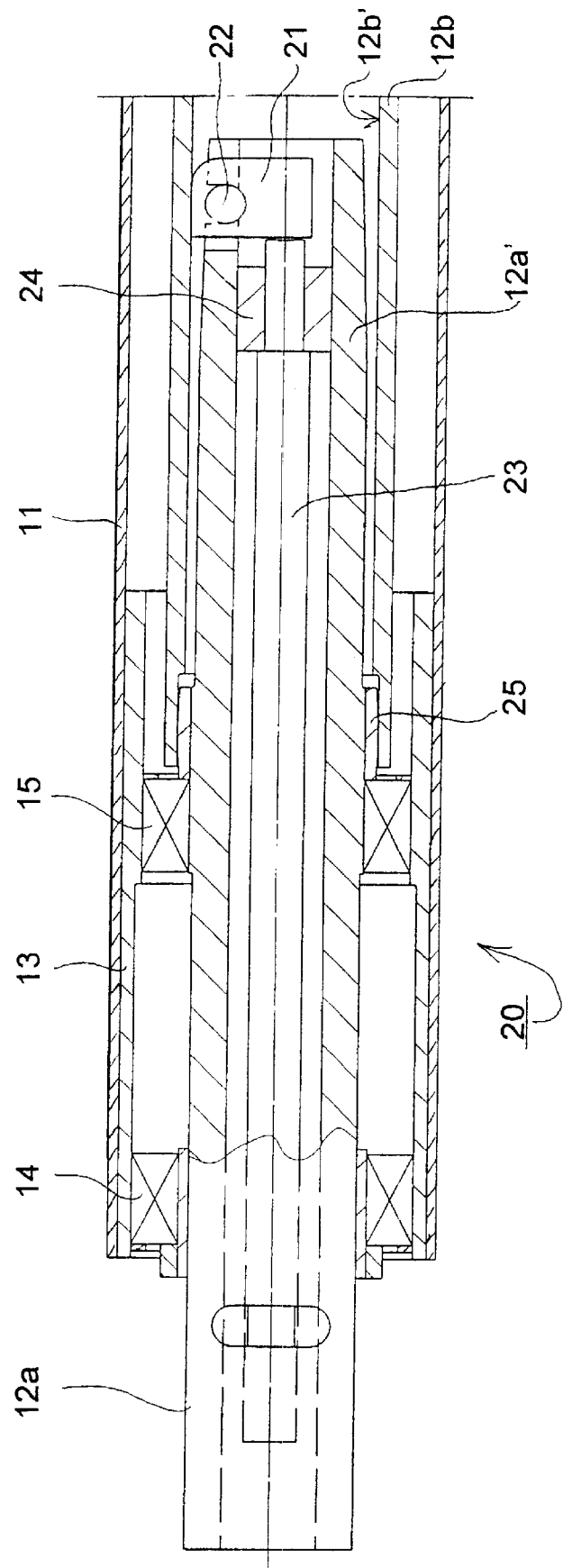
FIG. 2 is a more detailed illustration of the mechanism of bending of the roll as shown in FIG. 1.

FIG. 2 shows a first embodiment of the mechanism 20 of bending of the roll, which corresponds to the illustration of FIG. 1 on a larger scale. Thus, FIG. 2 illustrates one end area of the roll 10, but it is understood that the opposite end of the roll comprises a fully similar construction. As came out in the description above, the axle of the roll 10 consists of three parts, i.e. of an end part 12a placed in each end area of the roll and of a middle part 12b interconnecting these end parts. Further, referring to the description above, in the end areas of the roll, support sleeves 13 have been fitted, which have been mounted revolvingly on the end parts 12a of the axle by means of pairs of bearings, i.e. the bearings 14,15. The roll mantle 11 has been fitted on the support sleeves 13 so that the bearings 14,15 alone take care of the journalling of the roll mantle 11 without necessity of using bearings in the middle area of the roll at all. The end parts 12a of the axle extend, in the axial direction of the pair of bearings, from the inner bearings 15 a certain distance in the axial direction into the roll, and the middle part 12b of the axle is a tubular piece, in the way illustrated in the figures, into whose interior the parts of the end parts 12a of the axle that extend inwards axially from the inner bearings 15 of the pair of bearings penetrate. The end parts 12a and the middle part 12b are interconnected by means of an articulated joint member 25, which prevents the end parts 12a and the middle part 12b from moving in relation to one another in the radial direction, but which permits an inclining of said end parts and the middle part in relation to one another in the axial direction of the roll. The inner diameter of the tubular middle part 12b of the axle is substantially larger than the outer diameter of the end parts 12a, so that said inclining of the end parts 12a and the middle part 12b in relation to one another around the articulated joint member 25 is permitted. The end parts 12a of the axle are also hollow, tubular pieces, into whose interior the parts of the mechanism of bending of the roll have been fitted.

In the exemplifying embodiment of FIG. 2, the bending mechanism 20 comprises a cam member 21, which is mounted pivotally in the wall 12a' of the tubular end part by means of an articulation pin 22 placed in the cross direction of the roll so that, in relation to said articulation pin 22, the cam member 21 forms a two-arm lever, whose inner end penetrates into the interior of the tubular end part 12a and whose outer end extends through the wall 12a' of said tubular end part to outside the end art and rests against the inner face 12b' of the middle part 12b. Further, in the interior of the tubular end part 12a, a regulation rod 23 is fitted, which is displaceable in the axial direction and which is supported against the wall 12a' of the tubular end part so that the regulation rod 23 is placed centrally inside the end part 12a. The inner end of the regulation rod 23 is supported against the cam member 21. The regulation rod 23 is provided, for example, with screw means or equivalent members (not shown) so that, when the regulation rod 23 is rotated, it can be shifted precisely in the axial direction of the roll into the desired position. In FIG. 2, the regulation mechanism 20 is shown in the neutral position, i.e. in a position in which the roll is not bent. Further, in the illustration in FIG. 2, the cam member 21 rests. against the inner face 12b' of the middle part of the axle. This is, however, not fully indispensable in view of the operation, for in said neutral position there may be a little gap between the cam member 21 and the inner face 12b' of the middle part. The cam member 21 is shaped so that, when the regulation rod 23 starts being shifted in the axial direction, for example by rotating, inwards in the roll, the regulation rod 23, at the same time, pivots the cam member 21 around the articulation pin 22, in which connection, as the cam member 21 pivots, it is supported with a greater force against the inner face 12b' of the middle part 12b of the axle while at the same time increasing the distance between the end part 12a and the middle part 12b of the axle at the side of the cam member 21. In this connection the axle bends.

Figure 3:
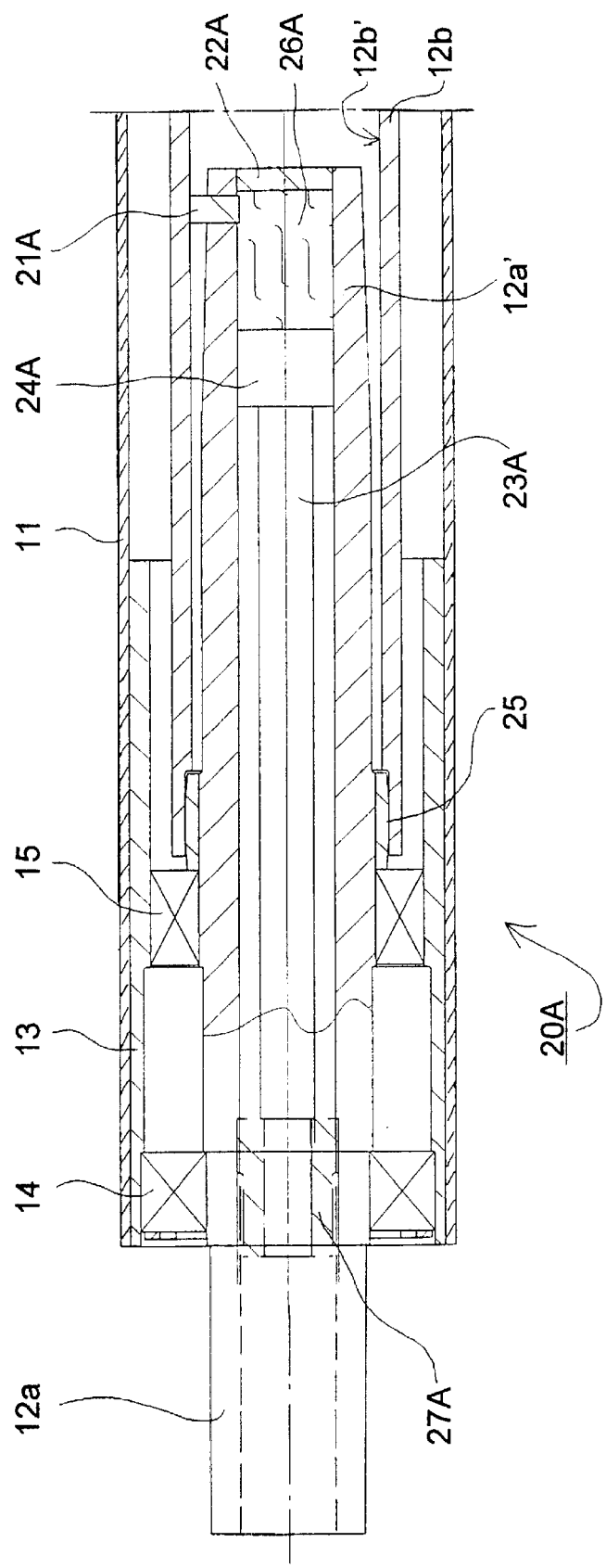
FIG. 3 is an illustration corresponding to FIG. 2 of an alternative construction of the mechanism of bending.

FIG. 3 shows an alternative embodiment of the mechanism of regulation of bending of the roll. In FIG. 3, the regulation mechanism is denoted with the reference 20A. The end area of the roll is in the other respects identical with that described in relation to FIG. 2, so that, in the following, the construction shown in FIG. 3 will be described in respect of the regulation mechanism only. In the embodiment of FIG. 3, the regulation mechanism 20A is hydraulically operated. In the axial direction, the inner end of the end part 12a of the axle is closed by means of a wall 22A, and a piston 24A has been fitted inside the tubular end part 12a so that said piston 24A and the end 22A define a cylinder space 26A between them. The cylinder space 26A is filled with a pressure medium, for example hydraulic fluid. The piston 24A is connected with a rod 23A, which penetrates axially out through the roll end. In the exemplifying embodiment shown in FIG. 3, a screw member 27A is fitted in the end part 12a of the axle, by means of which screw member 27A the rod 23A and, thus, the piston 24A can be regulated and shifted in the axial direction of the roll. When the piston 24A is shifted in the axial direction, the volume of the cylinder space 26A can be changed. At the cylinder space 26A, in the wall 12a' of the tubular end part, a piston member 21A has been fitted, which penetrates radially through said wall 12', which rests against the inner wall 12b' of the middle part 12b of the roll axle, and upon which piston member 21A the pressure in the cylinder space 26A can act. In this connection, when the volume of the cylinder space 26A is reduced by means of the piston 24A, the pressure is increased in said cylinder space 26A and shifts the piston member 21A in the radial direction outwards with a greater force against the inner wall 12b' of the middle part of the axle. In such a case, the axle and, thus, the whole roll 10 can be bent in the desired way.

Figure 4:
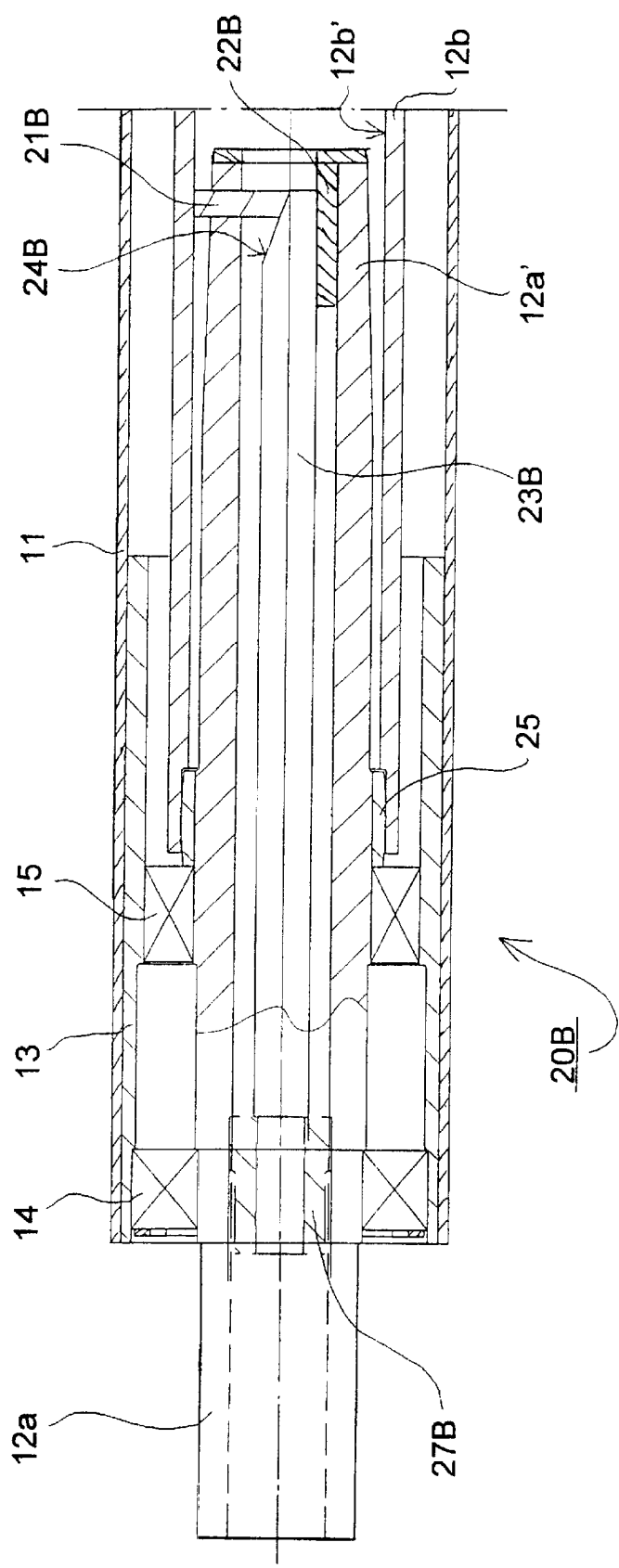
FIG. 4 is an illustration corresponding to FIGS. 2 and 3 of a further alternative embodiment of the mechanism of bending.

Finally, in FIG. 4, a further alternative solution of the bending mechanism of the roll is illustrated, which mechanism is denoted with the reference 20B in FIG. 4. FIG. 4 differs from the illustrations in FIGS. 2 and 3 exclusively in respect of the bending mechanism 20B, and in the other respects, in this figure, the same reference denotations have been used as in said FIGS. 2 and 3. In the embodiment that is being described now, the bending mechanism 20B consists of a regulation rod 23B, which has been fitted axially inside the tubular end part 12a of the roll axle. In the axial direction, at the outer end of the regulation rod 23B, a screw member 27B or an equivalent device is fitted, by whose means the regulation rod 23B can be shifted and regulated in the axial direction. To the opposite end of the regulation rod 23B, i.e. to the inner end in the axial direction, an oblique, wedge-shaped face 24B has been formed. Further, to the inner end of the end part 12a of the roll axle, a radially extending and moving wedge piece 21B has been fitted, which is supported against the inner face 12b' of the middle part 12b of the roll axle, on one hand, and against the wedge-shaped face 24B of the regulation rod 23B, on the other hand. At the side of the regulation rod 23B opposite in relation to the wedge piece 21B, a support 22B has been fitted inside the tubular end part 12a, on which support 22B the regulation rod 23B rests. In such a case, when the regulation rod 23B is shifted in the axial direction, the wedge piece 21B can be made to move in the radial direction so that, when the regulation rod 23B is shifted axially inwards in the roll, the wedge piece 21B moves radially outwards and rests with a greater force against the inner face 12b' of the middle part 12b of the roll axle. By means of this arrangement, the roll axle and, thus, the whole roll can be bent in the desired way.

Owing to the embodiments described above of the bending mechanism of the roll 10, the bearing arrangements can be eliminated in the roll completely from under the paper web, in which case the heat arising from the bearings does not cause a marking in the paper web. The bearings can be fitted exclusively in the end areas in the roll, in which case their lubrication and cooling can be arranged easily. Further, it is significant from the point of view of the invention that, owing to its bending mechanism, the roll 10 retains its curved form even if it had been removed from the machine. By means of the novel construction, it is possible to use a roll mantle 11 consisting of one part on the roll. Further, if constructions of different bend curve forms are desired, the mantle can be made of a composite material, in which connection, when the composite mantle is being manufactured, its rigidity can be varied readily by just changing the fibre angle. In this way, constructions with different rigidities in different locations of the roll can be obtained, whereby the bending curve of the roll can be shaped as desired. Moreover, in respect of its resistance to fatigue, composite is an excellent material.

Above, the invention has been described by way of example with reference to the figures in the accompanying drawing. The invention is, however, not confined exclusively to the exemplifying embodiments illustrated in the figures, but different embodiments of the invention may show variation within the scope of the inventive idea defined in the accompanying patent claims.

what is claimed is:

1. A roll for a web-like material comprising:
    a non-revolving roll axle (12a, 12b);
    a roll mantle (11) journalled revolvingly by means of bearings (14, 15) on said roll axle, and which roll (10) can be bent to a shape of a desired arc, wherein the roll mantle (11) is a continuous, tubular mantle and wherein the roll axle consists of three parts linked with one another, said three parts including a first and second end part (12a) and a middle part (12b), which are pivotal in relation to one another for a purpose of bending the roll mantle (11); and
    a bending mechanism arranged in said first end part for causing a radial shift of said middle part relative to said first end part.

2. A roll as claimed in claim 1, wherein the roll mantle (11) is journalled on the roll axle exclusively in the areas of the roll ends by means of bearings (14,15) supported on the end parts (12a) of the axle.

3. A roll as claimed in claim 1, wherein, by means of the bearings (14,15), support sleeves (13) have been mounted in the end areas of the roll (10), onto which sleeves the roll mantle (11) has been fitted.

4. A roll as claimed in claim 3, wherein the support sleeves (13) have been mounted on the end parts (12a) of the axle by means of bearings (14,15), which form pairs of bearings and which have been fitted at a short distance from one another, the end parts (12a) of the axle extending from the axially inner bearings (15) of the pairs of bearings a certain distance into the interior of the roll.

5. A roll as claimed in claim 1, wherein the end parts (12a) of the roll axle are hollow and tubular so that the bending mechanism (20,20A,20B) of the roll has been fitted inside said end parts.

6. A roll as claimed in claim 1, wherein the middle part (12b) of the roll axle is a tubular piece, whose inner diameter is larger than the end parts (12a), which has been fitted between the inner bearings (15) of the pairs of bearings at the opposite ends of the roll, and which is placed overlapping the end parts (12a) of the axle over a part of the length.

7. A roll as claimed in claim 1, wherein the middle part (12b) of the axle is coupled with the end parts (12a) from beside the inner bearings (15) of the pairs of bearings by means of articulated joint members (25), and that the inner diameter of the middle part (12b) is so much larger than the outer diameter of the end parts (12a) that a gap remains between them.

8. A roll as claimed in claim 1, wherein the member that produces the radial shift is a cam member (21), a wedge member (21B), a hydraulic piston member (21A).

9. A roll as claimed in claim 1, wherein the member (21,21A, 21B) that produces the radial shift is mechanically or hydraulically operated.

10. A roll as claimed in claim 1, wherein the roll mantle (11) is made of a composite material.

11. A roll for a web, comprising
    a non-revolving roll axle comprising first and second end parts and a middle part situated between said first and second end parts,
    a continuous, tubular roll mantle revolvingly journaled on said roll axle and extending over said first and second end parts and said middle part,
    said middle part being pivotally linked to said first and second end parts to enable said roll axle and thus said roll mantle to axially bend, and
    bending means arranged in said first end part for causing a radial shift of said middle part relative to said first end part.

12. The roll of claim 11, further comprising
    bearing means for journalling said roll mantle on said first and second end parts whereby said roll mantle is not journalled on said middle part.

13. The roll of claim 12, wherein a pair of said bearing means are arranged to journal each of said support sleeves.

14. The roll of claim 12, further comprising
    support sleeves interposed between said bearing means and said roll mantle.

15. The roll of claim 11, wherein said middle part is tubular and has an inner diameter larger than an outer diameter of said first and second end parts and overlaps a portion of said first and second end parts.

16. The roll of claim 11, further comprising articulated joint members for coupling said middle part to said first and second end parts.

17. The roll of claim 11, wherein said bending means comprise a cam member abutting against an inner face of said middle part and rotatably mounted to said first end part, and a movable rod extending through said first end part and abutting said cam member such that movement of said rod causes rotation of said cam member and the radial shifting of said middle part relative to said first end part.

18. The roll of claim 11, wherein said bending means comprise a fluid-filled chamber in said first end part, a first movable piston arranged to be acted upon by the fluid in said chamber and abutting against an inner face of said middle part, a second movable piston defining a wall of said chamber and a movable rod extending through said first end part and abutting said second piston such that movement of said rod causes movement of said second piston resulting in adjustment of the pressure of the fluid in said chamber and thus a corresponding movement of said first piston resulting in radial shifting of said middle part relative to said first end part.

19. The roll of claim 11, wherein said bending means comprise a movable wedge piece abutting against an inner face of said middle part and having an inclined surface, and a movable rod extending through said first end part and having an inclined surface engaging said inclined surface of said wedge piece such that movement of said rod causes movement of said wedge piece via the engaging inclined surfaces and the radial shifting of said middle part relative to said first end part.

20. The roll of claim 11, wherein said roll mantle is made of a composite material.

* * * * *